(12) United States Patent
Murase

(10) Patent No.: US 6,488,297 B2
(45) Date of Patent: Dec. 3, 2002

(54) SUSPENSION DEVICE OF INDUSTRIAL VEHICLE

(75) Inventor: Mikio Murase, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 70 days.

(21) Appl. No.: 09/760,361

(22) Filed: Jan. 12, 2001

(65) Prior Publication Data

US 2001/0013692 A1 Aug. 16, 2001

(30) Foreign Application Priority Data

| Jan. 14, 2000 | (JP) | 2000-006793 |
| Jan. 14, 2000 | (JP) | 2000-006794 |
| Jan. 14, 2000 | (JP) | 2000-006795 |
| Jan. 14, 2000 | (JP) | 2000-006796 |

(51) Int. Cl.⁷ .............................................. B60G 17/00
(52) U.S. Cl. ...................... 280/124.1; 280/80.1; 280/43
(58) Field of Search ....................... 280/124.1, 124.125, 280/124.116, 124.128, 80.1, 81.1, 767, 43, 43.17

(56) References Cited

U.S. PATENT DOCUMENTS 2,753,946 A * 7/1956 Quayle ........................ 180/21

FOREIGN PATENT DOCUMENTS

| JP | 8-156544 | 6/1996 | ............ B60G/1/02 |
| JP | 8-164722 | 6/1996 | ............ B60G/3/02 |
| JP | 301233 A | * 11/1999 | |
| JP | 321267 A | * 11/1999 | |
| JP | 105818 A | * 4/2001 | |
| JP | 29234 A | * 1/2002 | |

* cited by examiner

Primary Examiner—Paul N. Dickson
Assistant Examiner—Faye M. Fleming
(74) Attorney, Agent, or Firm—Morgan & Finnegan, LLP

(57) ABSTRACT

A suspension device suspends a driving wheel and a caster, which are laterally spaced from one another. A cab is located above the caster. A drive unit support supports a drive unit to which the driving wheel is attached. The drive unit support is fixed to a rotary shaft that extends in the lateral direction of the vehicle. The rotary shaft is located in front of the drive unit. The drive unit support is not located between the drive unit and the cab. Thus, the width of the cab is maximized without increasing the width of the vehicle body.

22 Claims, 13 Drawing Sheets

SUSPENSION DEVICE OF INDUSTRIAL VEHICLE

BACKGROUND OF THE INVENTION

The present invention relates to a suspension device of an industrial vehicle and, more particularly, to a suspension device for a reach type forklift.

FIG. 17 illustrates a suspension device for a reach type forklift, which is disclosed in Japanese Unexamined Patent Publication No. 8-164722. FIG. 17 is rear view of a forklift. The suspension device suspends a rear wheel 183 and a caster 184 such that the rear wheel 183 and the caster 184 move vertically relative to the vehicle body. The rear wheel 183 functions as a driving wheel and a steered wheel.

A cab 180 is located at the rear right of the body. An operator stands in the cab 180. A control panel 181 is located in the front of the cab 180. A steering wheel 182 is located to the left of the cab 180. The rear wheel 183 is steered in accordance with manipulation of the steering wheel 182. The rear wheel 183, or the driving wheel, is located to the left of the cab 180. The caster 184 is located below a bottom plate 180a of the cab 180.

The suspension device includes a parallel linkage 188. The parallel linkage 188 includes a support link 191, an upper link 192, a lower link 193 and a caster link 194. The support link 191 includes a horizontal support base 191a and an arm 191b, which extends downward from one end of the support base 191. A drive unit 187 for supporting the driving wheel 183 is attached to the support base 191a. The drive unit 187 includes a drive motor 185 and a gear housing 186. The gear housing 186 has gears for transmitting rotation of the drive motor 185 to the driving wheel 183. The caster 184 is attached to the distal end of the caster link 194.

One end of the upper link 192 is coupled to the vehicle body by a shaft 195. The other end,of the upper link 192 is coupled to the support base 191a by a shaft 197. One end of the lower link 193 is coupled to the lower end of the arm 191b by a shaft 198. The other end of the lower link 193 is coupled to the vehicle body by a shaft 196. The proximal end of the caster link 194 is coupled to the shaft 196. The axes of the shafts 195 to 198 are the vertexes of an imaginary parallelogram.

The shafts 195, 196 are fixed to the vehicle body. In other words, the shafts 195, 196 are fulcrums of the linkage 188. The parallel linkage 188 is moved about the shafts 195, 196 in accordance with the load acting on the driving wheel 183 and the caster 184. The shafts 195, 196 function as fulcrums. As a result, the driving wheel 183 and the caster 184 are moved in opposite directions.

A lift mechanism (not shown) for carrying loads is located in the front portion of the vehicle body. A reach cylinder 110 is located at the lower part of the body in the center of the lateral direction. The reach cylinder 110 moves the lift mechanism forward and-rearward. The reach cylinder 110 extends in the longitudinal direction of the vehicle body and intersects the lower link 193.

The cab 180 is preferably wide for permitting an operator to easily manipulate the forklift (width is the left-right dimension of FIG. 17). However, in the forklift shown in FIG. 17, the arm 191b of the support link 191 is located to the right of the drive unit 187. That is, the arm 191b is located between the drive unit 187 and the cab 180. Accordingly, the width of the cab 180 is reduced by an amount corresponding the size of the arm 191b.

The width of the vehicle may be increased to increase the width of the cab 180. However, increasing the width of the vehicle hinders loading and unloading in small spaces.

The lower link 193 is located below the bottom plate 180a of the cab 180. The reach cylinder 110 is located below the lower link 193 and is transverse to the lower link 193. Therefore, a relatively large space is required below the bottom plate 180a for the lower link 193 and the reach cylinder 110. To permit the lower link 193 move vertically, space for the lower link 193 to move must be provided. Accordingly, the bottom,plate 180a must be located at a relatively raised position.

However, raising the bottom plate 180a makes it harder for an operator to get on and off the vehicle. Operators frequently get on and off reach type forklifts. The bottom plate 180a, which is raised to a relatively high position, thus lowers efficiency and increases operator fatigue.

Japanese Unexamined Patent Publication No. 8-156544 discloses a suspension device that is similar to the device of FIG. 17. The device of the publication No. 8-156544 does not include a parallel linkage. However, like the device of FIG. 17, elements that form the suspension are located between the cab and the drive unit. Therefore, the width of the cab is limited.

SUMMARY OF THE INVENTION

Accordingly, it an objective of the present invention to provide a suspension device that increases the width of the cab of a vehicle without increasing the width of the vehicle body of the vehicle.

Another objective of the present invention is to provide a suspension device that lowers the bottom plate of the cab.

To achieve the foregoing and other objectives and in accordance with the purpose of the present invention, a suspension device for an industrial vehicle is provided. The vehicle has a driving wheel and a coasting wheel, which are laterally spaced apart. The suspension device suspends the driving wheel and the coasting wheel relative to a vehicle body. A cab is located at a side of the vehicle body and above the coasting wheel. The suspension device includes a coasting wheel support, a drive unit, a drive unit support and a coupler. The coasting wheel support supports the coasting wheel such that the coasting wheel moves upward and downward relative to the vehicle body. The driving wheel is attached to the drive unit. The drive unit support supports the drive unit such that the drive unit moves upward and downward relative to the vehicle body. The coupler is located in the vehicle body. The drive unit support is coupled to the coupler such that the drive unit support moves relative to the vehicle body. The coupler is located at a position other than a position that is lateral of the drive unit.

The present invention provides another suspension device for an industrial vehicle. The vehicle has a driving wheel and a coasting wheel, which are laterally spaced apart. The suspension device suspends the driving wheel and the coasting wheel relative to a vehicle body. The suspension device includes a coasting wheel support, a drive unit, a drive unit support and an interlock mechanism. The coasting wheel support supports the coasting wheel such that the coasting wheel moves upward and downward relative to the vehicle body. The driving wheel is attached to the drive unit. The drive unit support supports the drive unit such that the drive unit moves upward and downward relative to the vehicle body. The interlock mechanism interlocks the drive unit support with the coasting wheel support such that the driving wheel and the coasting wheel move in opposite directions.

The interlock mechanism includes a rotatable shaft that extends in the lateral direction of the vehicle body. Load acting on the driving wheel and load acting on the coasting wheel are applied to the shaft as opposing torsional forces. The shaft rotates such that the torsion applied to the shaft by the driving wheel and the torsion applied to the shaft by the coasting wheel are balanced, and the driving wheel and the coasting wheel move in opposite directions.

The present invention further provides another suspension device for an industrial vehicle. The vehicle has a driving wheel and a coasting wheel, which are laterally spaced apart. The suspension device suspends the driving wheel and the coasting wheel relative to a vehicle body. The vehicle includes a cab located at a side of the vehicle body and above the coasting wheel. The vehicle also includes a carrier for carrying a load and an actuator for moving the carrier forward and rearward. The suspension device includes a coasting wheel support, a drive unit, a drive unit support and an interlock mechanism. The coasting wheel support supports the coasting wheel such that the coasting wheel moves upward and downward relative to the vehicle body. The driving wheel is attached to the drive unit. The drive unit support supports the drive unit such that the drive unit moves upward and downward relative to the vehicle body. The interlock mechanism interlocks the drive unit support with the coasting wheel support such that the driving wheel and the coasting wheel move in opposite directions. The interlock mechanism crosses the actuator at a location that is forward or rearward of the cab.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
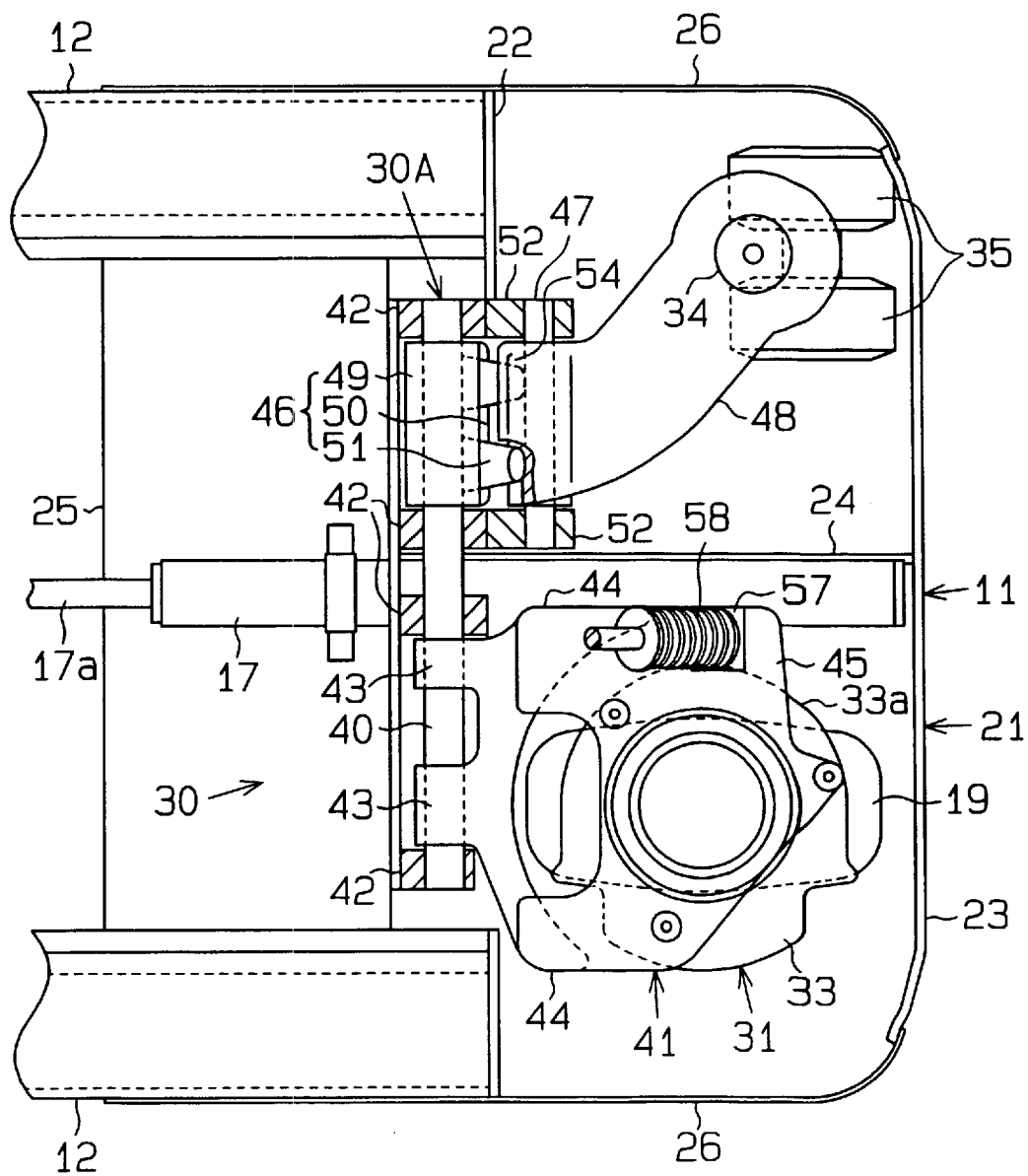
FIG. 1 is a top view, with a part cut away, illustrating a rear suspension device of a reach type forklift according to a first embodiment of the present invention.
Figure 2:
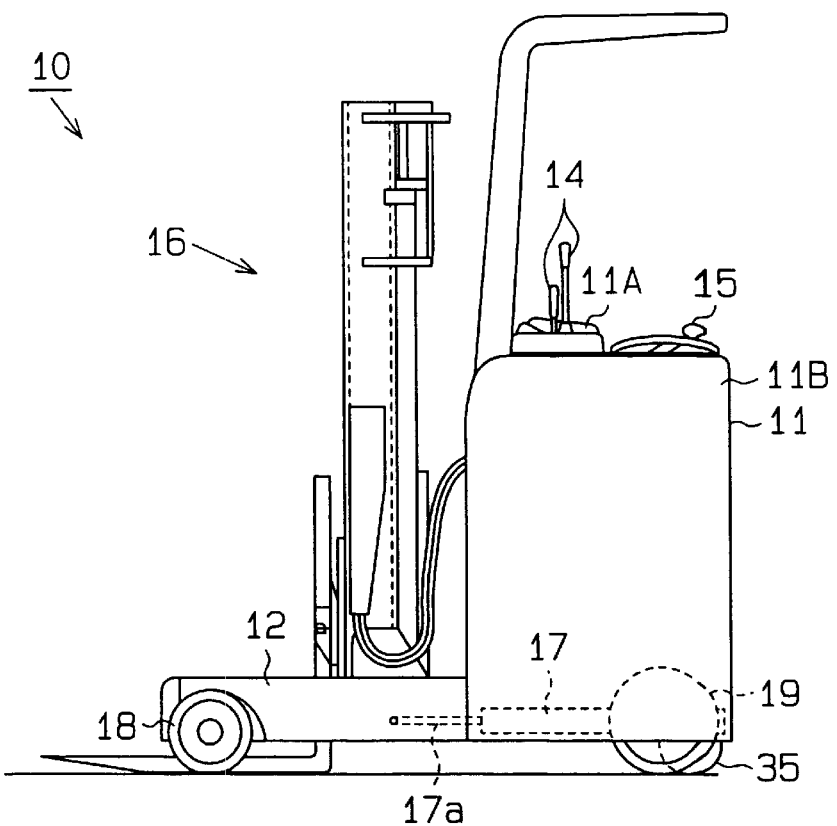
FIG. 2 is a side view illustrating the reach type forklift of FIG. 1.
Figure 3:
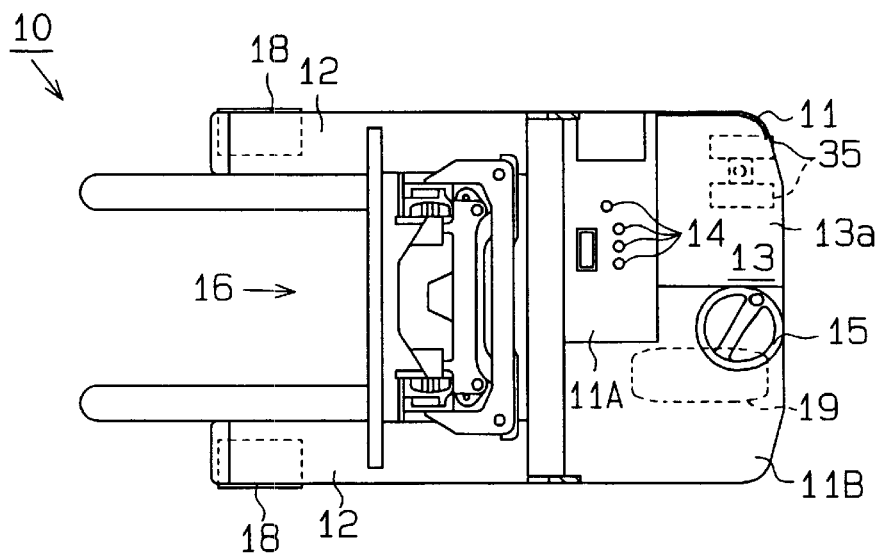
FIG. 3 is a top view of the reach type forklift of FIG. 1.

A fist embodiment of the present invention will now be described with reference to FIGS. 1 to 6. As shown in FIGS. 2 and 3, an industrial vehicle, which is a reach type forklift 10, includes a body 11 and reach legs 12. The reach legs 12 extend forward (to the left as viewed in FIGS. 2 and 3) from the body 11. The body 11 has a cab 13, in which an operator stands. The cab 13 is located in the rear right section of the body 11. The body 11 also includes an instrument panel 11A located in the front of the cab 13 and a box 11B located to the left of the cab 13. Several hand levers 14 are located on the instrument panel 11A. A steering wheel 15 is located on the box 11B.

A lift mechanism 16 is located on the body 11 and moves forward and backward along the reach legs 12. The lift mechanism 16 includes a mast, a fork and a lift cylinder. The fork is lifted and lowered by the lift cylinder. A hydraulic reach cylinder 17 is located in the bottom portion of the body 11. The reach cylinder 17 is centrally located as shown in FIG. 1. A piston rod 17a of the reach cylinder 17 is coupled to the lift mechanism 16. In response to manipulation of a reach lever, which is one of the manipulation levers 14, an oil control valve (not shown) controls the flow rate of oil supplied to the reach cylinder 17. Accordingly, the piston rod 17a horizontally moves the lift mechanism 16 within a predetermined stroke.

A pair of front wheels 18, which are coasting wheels, are supported by the ends of the reach legs 12, respectively. A rear wheel 19, which is a driving wheel, is located in the rear left of the body 11. The driving wheel 19 steered by manipulating the steering wheel 15. A caster 35, which has two coasting wheels, is located in the rear right section of the body 11. The wheels of the caster 35 are not powered.

Figure 4:
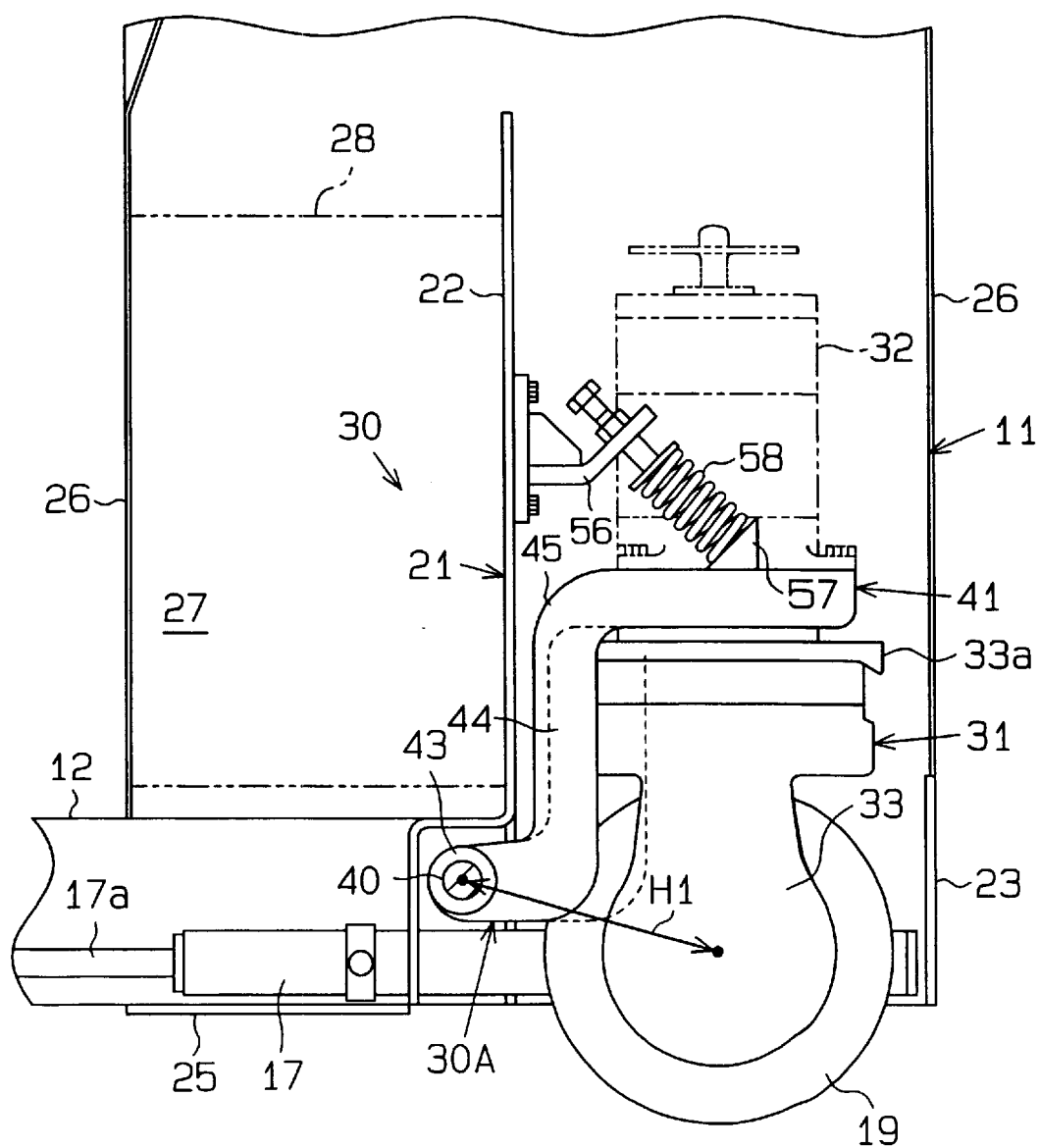
FIG. 4 is a left side view of the suspension device of FIG. 1.
Figure 6:
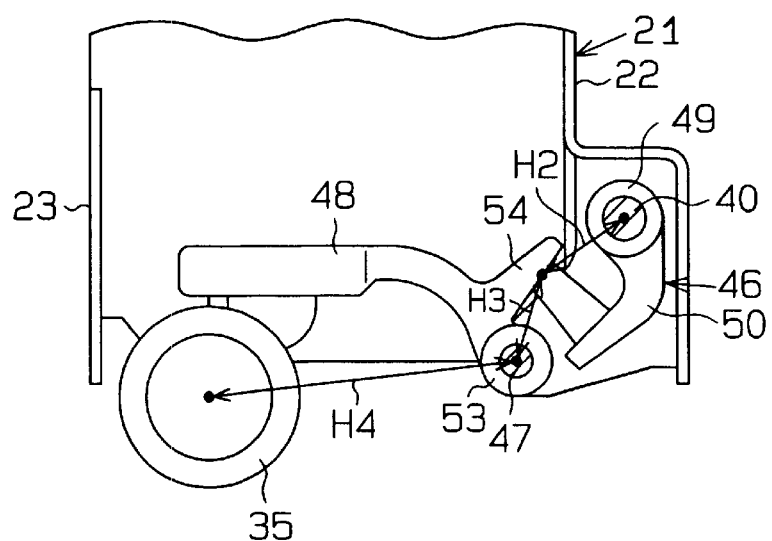
FIG. 6 is a right side view of the suspension device of FIG. 1.

As shown in FIGS. 1, 4 and 6, the body 11 includes a framework 21. The framework 21 has a front frame member 22, a rear frame member 23 and a coupler frame member 24. The front frame member 22 and the rear frame member 23 are located in the front and rear sides of the body 11, respectively. The front and rear frame members 22, 23 are plates that extend laterally and vertically. The coupler frame member 24 is a vertical plate that extends in the longitudinal direction of the forklift 10 and couples the front frame member 22 with the rear frame member 23. The coupler frame member 24 is located between the cab 13 and the box 11B. A bottom plate 25 is welded to the lower surface of the reach legs 12 to couple the reach legs 12 with each other. Panels 26 are attached to the framework 21 and cover the front, rear and sides of the body 11.

As shown in FIG. 4, a battery chamber 27 is defined in the lower portion of the body 11. The battery chamber 27 is located at the front of the front frame member 22. A battery 28 is accommodated in the battery chamber 27. The widths of the battery chamber 27 and the battery 28 are substantially the same as the width of the body 11.

Figure 5:
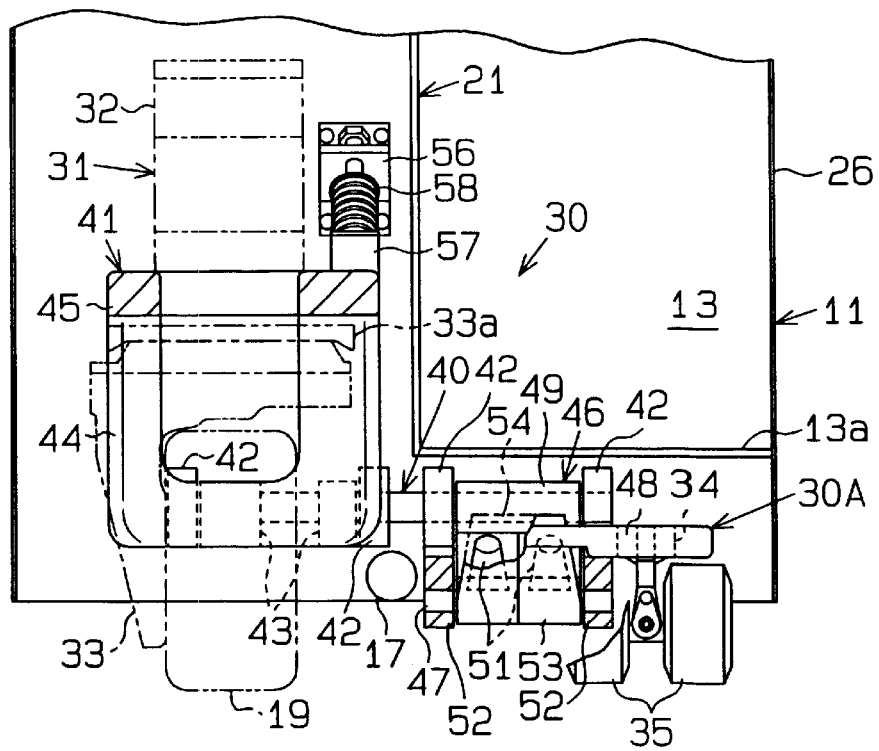
FIG. 5 is a rear view of the suspension device of FIG. 1.

As shown in FIGS. 1, 4 and 5, a suspension device 30 is located in the rear section of the body 11. The suspension device 30 suspends the driving wheel 19 and the caster 35 such that the driving wheel 19 and the caster 35 move vertically relative to the framework 21.

The suspension device 30 includes an interlock mechanism 30A. The interlock mechanism 30A moves the driving wheel 19 and the caster 35 in opposite directions. The interlock mechanism 30A includes a drive unit support 41, a first rotary shaft 40, a transmission arm 46, a second rotary shaft 47 and a caster support 48.

The drive unit support 41 supports a drive unit 31. The driving wheel 19 is coupled to the drive unit 31. The caster 35 is coupled to the caster support 48. The first rotary shaft 40 extends in the lateral direction of the body 11. The length of the first rotary shaft 40 is approximately half of the width of the body 11. Four bearings 42 are fixed to the framework 21 to support the first rotary shaft 40 at the ends of the shaft 40 and at the center. Each bearing 42 includes a bracket fixed to the framework 21 and a cylindrical bushing fitted in a hole of the bracket. The second rotary shaft 47 corresponds to the left portion of the first rotary shaft 40 and extends parallel to the first rotary shaft 40. Two bearings 52 are attached to the framework 21 to support the second rotary shaft 47 at the ends.

The first rotary shaft 40 is located at the front of the cab 13 and higher than the reach cylinder 17. The first rotary shaft 40 is transverse to the reach cylinder 17 at the front of the cab 13. The second rotary shaft 47 is located below the bottom plate 13a of the cab 13 (see FIG. 5).

A pair of cylindrical couplers 43 are formed at the proximal end of the drive unit support 41. The couplers 43 mate with the first rotary shaft 40 by splines. Thus, the drive unit support 41 integrally rotates or pivots with the first rotary shaft 40 about the axis of the first rotary shaft 40. In other words, the drive unit support 41 pivots about the axis of the first rotary shaft 40.

As shown in FIG. 4, the drive unit support 41 is substantially shaped like a crank. The drive unit support 41 includes an arm 44 extending upward and a support base 45 extending horizontally rearward from the upper end of the arm 44. The drive unit 31 is attached to the base 45. The arm 44 supports the drive unit 31 from the front.

The drive unit 31 includes a motor 32 and a gear housing 33. The motor 32 is attached to the upper surface of the base 45, and the gear housing 33 is supported by the lower surface of the base 45. The gear housing 33 rotates in a horizontal plane. Rotation of the motor 32 is transmitted to the driving wheel 19 through gears in the gear housing 33. The driving wheel 19 is supported by the gear housing 33. A gear wheel 33a is fixed to the upper portion of the gear housing 33. Although not shown in the drawings, the steering wheel 15 is connected to a steering shaft (not shown) through a universal joint (not shown) and a gear at the lower end of the steering shaft is mated with the gear wheel 33a. The driving wheel 19 is steered in response to rotation of the steering wheel 15.

As shown in FIGS. 1, 5 and 6, a cylindrical coupler 53 is located at the proximal end of the caster support 48. The coupler 53 is mated with the second rotary shaft 47 by splines. Thus, the caster support 48 pivots integrally with the second rotary shaft 47 about the axis of the second rotary shaft 47. The caster support 48 extends from the coupler 53 and is curved, as shown in FIG. 1. The distal end of the caster support 48 supports the caster 35 through a bearing 34 such that the caster 35 pivots in a horizontal plane.

A cylindrical coupler 49 is located at the proximal end of the transmission arm 46. The coupler 49 is mated with the first rotary shaft 40 by splines. The transmission arm 46 rotates integrally with the first rotary shaft 40. The transmission arm 46 includes an arm plate 50 extending from the coupler 49 and a pair of projections 51 extending upward from the arm plate 50. A contact plate 54 extends from a part of the caster support 48 near the coupler 53 and contacts the projections 51. In FIG. 6, clockwise rotational force of the caster support 48 is transmitted to the first rotary shaft 40 through the contact plate 54 and the transmission arm 46, which rotates the first rotary shaft 40 counterclockwise. The transmission arm 46 and the contact plate 54 form a force transmission mechanism.

When the driving wheel 19 and the caster 35 contact the ground surface, force acting on the driving wheel 19 from the ground rotates the first rotary shaft 40 clockwise as viewed in FIG. 6. Force acting on the caster 35 the ground acts to rotate the first rotary shaft 40 counterclockwise as viewed in FIG. 6. That is, the direction of the force acting from the driving wheel 19 to the first rotary shaft 40 through the drive unit support 41 and the direction of the force acting from the caster 35 to the first rotary shaft 40 through the caster support 48, the contact plate 54 and the transmission arm 46 are opposite.

A bracket 56 is attached to the rear side of the front frame member 22. A bracket 57 is located on the base 45 of the drive unit support 41. An adjuster spring 58 is located between the brackets 56 and 57. The axis of the adjuster spring 58 is parallel to a tangent to the path of the drive unit support 41. The adjuster spring 58 urges the drive unit support 41 downward.

As shown in FIGS. 4 and 6, the distance between the axis of the first rotary shaft 40 and the axis of the driving wheel 19 is expressed by H4. The distance between the axis of the first rotary shaft 40 and the contact point between the projections 51 and the contact plate 54 is expressed by H2. The distance between the axis of the second rotary shaft 47 and the contact point between the projections 51 and the contact plate 54 is expressed by H3. The distance between the axis of the second rotary shaft 47 and the axis of the caster 35 is expressed by H4. The interlock mechanism 30A is designed and constructed such that the distances H1, H2, H3 and H4 satisfy the following equation.

$$H1 \approx (H2/H3)H4$$

If the force of the adjuster spring 58 is not taken into account, the load acting on the driving wheel 19, or the force that presses the driving wheel 19 against the road surface, is substantially equal to the load acting on the caster 35, or the force that presses the caster 35 against the road surface. However, since the force of the adjuster spring 58 acts on the driving wheel 19, the load acting on the driving wheel 19 is greater than the load acting on the caster 35.

Strictly speaking, the weight of the drive unit support 41 and the drive unit 31 influence the load acting on the driving wheel 19, and the weight of the caster support 48 influences the load acting on the caster 35. Therefore, to determine the relationship between the load acting on the driving wheel 19 and the load acting on the caster 35, the weights of the drive unit support 41, the drive unit 31 and the caster support 48 are preferably taken into account.

When the weight of the load on the lift mechanism 16 is maximum within an acceptable range and the lift mechanism 16 is at the most forward position, the load on the rear of the forklift 10 is small. However, the adjuster spring 58 maintains the load acting on the driving wheel 19 above the lowest demanded level, which prevents the driving wheel 19 from skidding.

When there is no load on the lift mechanism 16 and the lift mechanism 16 is located at the most rearward position, the load on the rear of the forklift 10 is great. However, if the force of the adjuster spring 58 is not taken into account, the driving wheel 19 and the caster 35 receive substantially the same amount of load. The driving wheel 19 and the caster 35 substantially equally bear the load, which prevents either of the driving wheel 19 and the caster 35 from receiving an excessive load.

As described above, the force transmitted from the driving wheel 19 to the first rotary shaft 40 acts in a direction opposite to the direction of the force transmitted from the caster 35 to the first rotary shaft 40, which generates torsion in the first rotary shaft 40. The first rotary shaft 40 pivots such that the force from the driving wheel 19 becomes equal to the force from the caster 35 to balance the load acting on the driving wheel 19 with the load acting on the caster 35. When the first rotary shaft 40 pivots, the driving wheel 19 and the caster 35 move in the opposite directions.

The first rotary shaft 40 is twisted by an amount corresponding to the forces transmitted from the driving wheel 19 and from the caster 35. The torsion reaction force of the first rotary shaft 40 increases as the torsion of the first rotary shaft 40 is increased. The driving wheel 19 and the caster 35 are pressed against the road surface by forces that correspond to the torsion reaction force of the first rotary shaft 40.

If the driving wheel 19 runs over a bump, the force transmitted from the driving wheel 19 to the first rotary shaft 40 is instantaneously increased. Accordingly, the first rotary shaft 40 is instantaneously twisted to permit the driving wheel 19 to move upward relative to the body 11. Subsequently, the first rotary shaft 40 is untwisted and rotated such that the force from the driving wheel 19 is balanced with the force from the caster 35. As a result, the caster 35 is lowered relative to the body 11 after a short time from when the driving wheel 19 was moved upward.

When the driving wheel 19 runs over a dip, the force transmitted from the driving wheel 19 to the first rotary shaft 40 is decreased. The first rotary shaft 40 is untwisted and rotated to permit the driving wheel 19 to move downward relative to the body 11. Subsequently, the first rotary shaft 40 is twisted and rotated such that the force transmitted from the driving wheel 19 is equal to the force transmitted from the caster 35. As a result, the caster 35 is moved upward relative to the body 11 after a short time from when the driving wheel 19 was moved downward.

When the caster 35 runs over a bump or a dip, the suspension device 30 operates in the same way described above. Torsion in the first rotary shaft 40 prevents the driving wheel 19 and the caster 35 from losing contact with the road surface.

The first embodiment has the following advantages.

The interlock mechanism 30A includes a first rotary shaft 40, which extends laterally, the drive unit support 41, and the caster support 48. The drive unit support 41 and the caster support 48 correspond to the ends of the first rotary shaft 40. The junction between the first rotary shaft 40 and the drive unit support 41, that is, the axis of the rotary shaft 40, is located in front of the drive unit 31. The arm 44 of the drive unit support 41 extends upward from the fulcrum to support the drive unit 31 from the front. The base 45, on which the drive unit 31 is mounted, extends substantially horizontally from the upper end of the arm 44.

The drive unit support 41 is not located on either side of the drive unit 31. In other words, as shown in FIG. 5, the drive unit support 41 is not located between the drive unit 31 and the cab 13, which is located to the right of the drive unit 31. Therefore, the width of the cab 13 is maximized without increasing the width of the body 11.

The first rotary shaft 40 is transverse to the reach cylinder 17 at a position in front of the cab 13 and is not located directly below the bottom plate 13a of the cab 13. Therefore, the bottom plate 13a is low, which permits an operator to easily get in the cab 13.

The first rotary shaft 40 receives forces of opposite direction from the driving wheel 19 and the caster 35. Since the rotary shaft 40 is relatively long, the shaft 40 is easily twisted by the applied forces. When the driving wheel 19 and the caster 35 contact the road surface, the first rotary shaft 40 remains twisted. By the reaction force of the torsion, the rotary shaft 40 presses the driving wheel 19 and the caster 35 against the road surface. When the forklift 10 runs over bumps and dips, the driving wheel 19 and the caster 35 remain in contact with the road surface.

Figure 17:
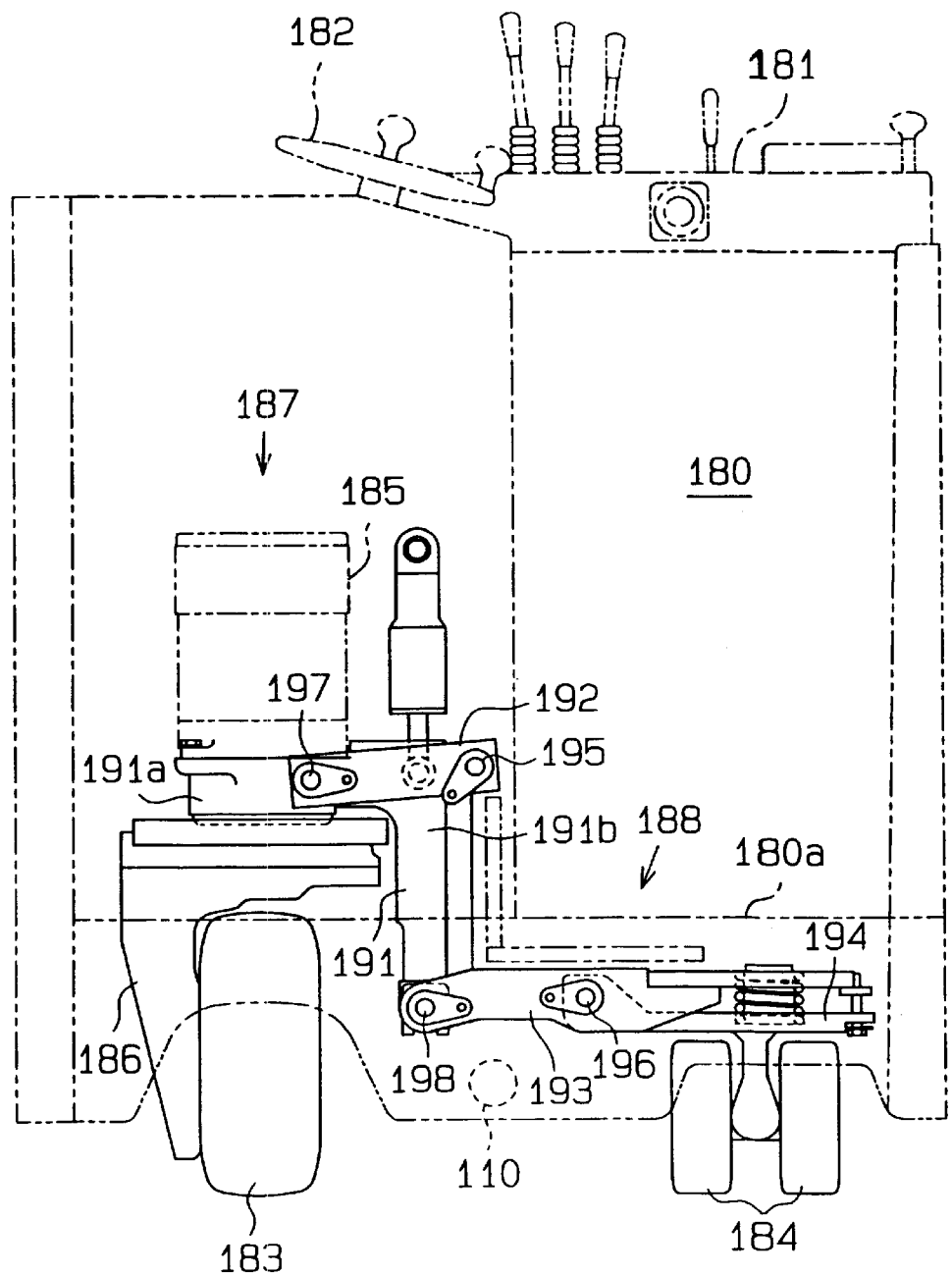
FIG. 17 is a rear view illustrating a prior art suspension device of a reach type forklift.

In the embodiment of FIGS. 1 to 6, the prior art parallel linkage of FIG. 17 is not located between the driving wheel 19 and the caster 35. Instead, the interlock mechanism 30A, which uses pivoting and torsion of the first rotary shaft 40, is located between the driving wheel 19 and the caster 35. Compared to the prior art suspension device, which has the parallel linkage, the suspension device 30, which has the interlock mechanism 30A, is simple and inexpensive. The driving wheel 19 and the caster 35 are located behind the first rotary shaft 40. In other words, the driving wheel 19 and the caster 35 are located at the same side of the first rotary shaft 40. This reduces the size of the suspension device 30.

The drive unit support 41, which supports the driving wheel 19, supports the drive unit 31 from the front and pivots about the axis of the first rotary shaft 40 in a vertical plane about a horizontal axis. Therefore, when the forklift 10 travels in a straight line, the driving wheel 19 is not inclined relative to the road surface, which prevents the driving wheel 19 from being worn unevenly.

The first rotary shaft 40 extends in the lateral direction of the body 11 between the reach legs 12. The first rotary shaft 40 is rotatably supported by the framework 21 and is not displaced relative to the framework 21. Thus, the first rotary shaft 40 can be located in a relatively small space that is close to the reach cylinder 17. Therefore, the space directly above the first rotary shaft 40 can be used for accommodating the battery 28. Also, the battery chamber 27 can be located at the lowest possible position. As a result, the center of gravity of the forklift 10 is lowered, which stabilizes the forklift 10.

Figure 7:
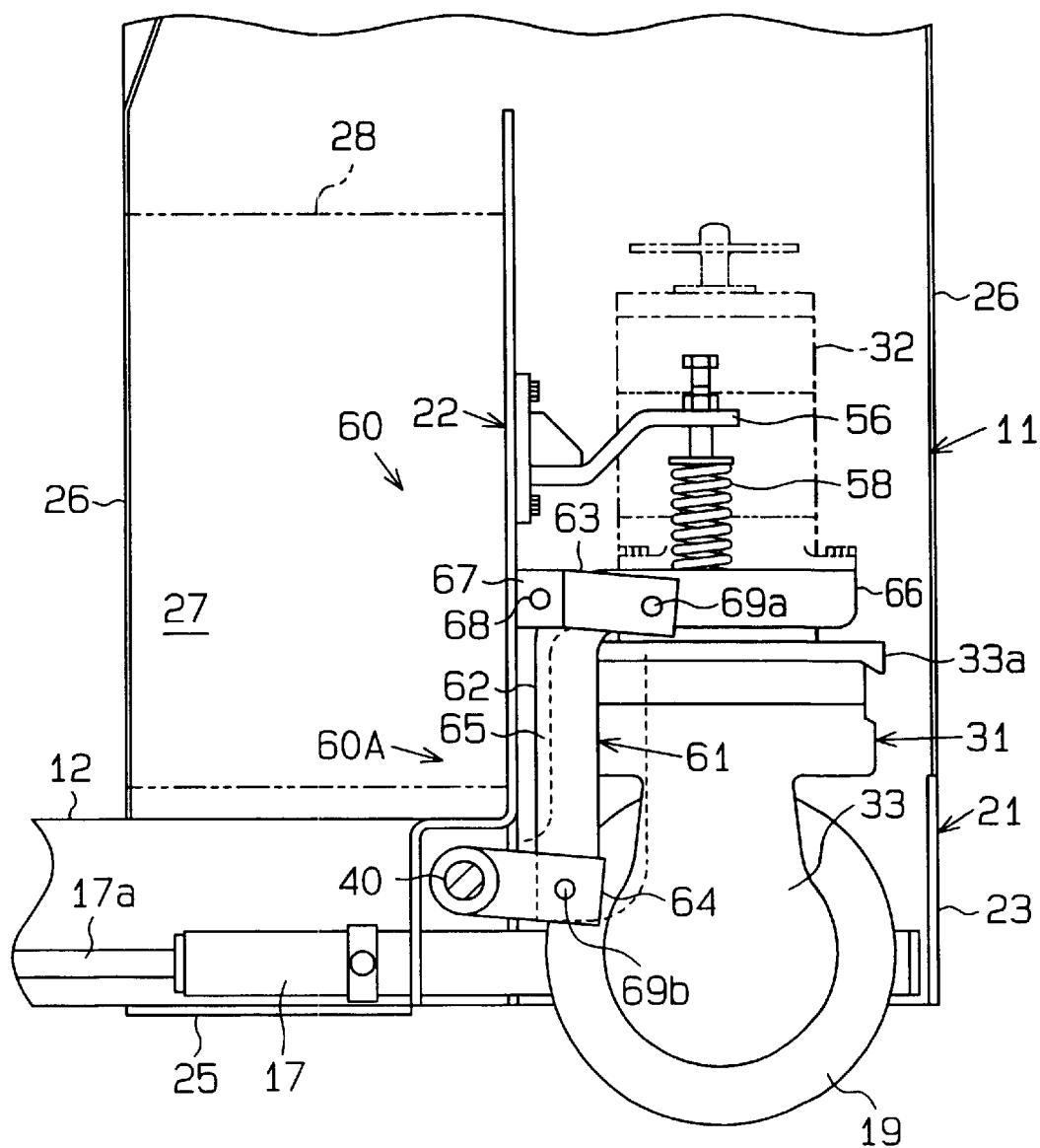
FIG. 7 is a left side view illustrating a suspension device according to a second embodiment of the present invention.
Figure 8:
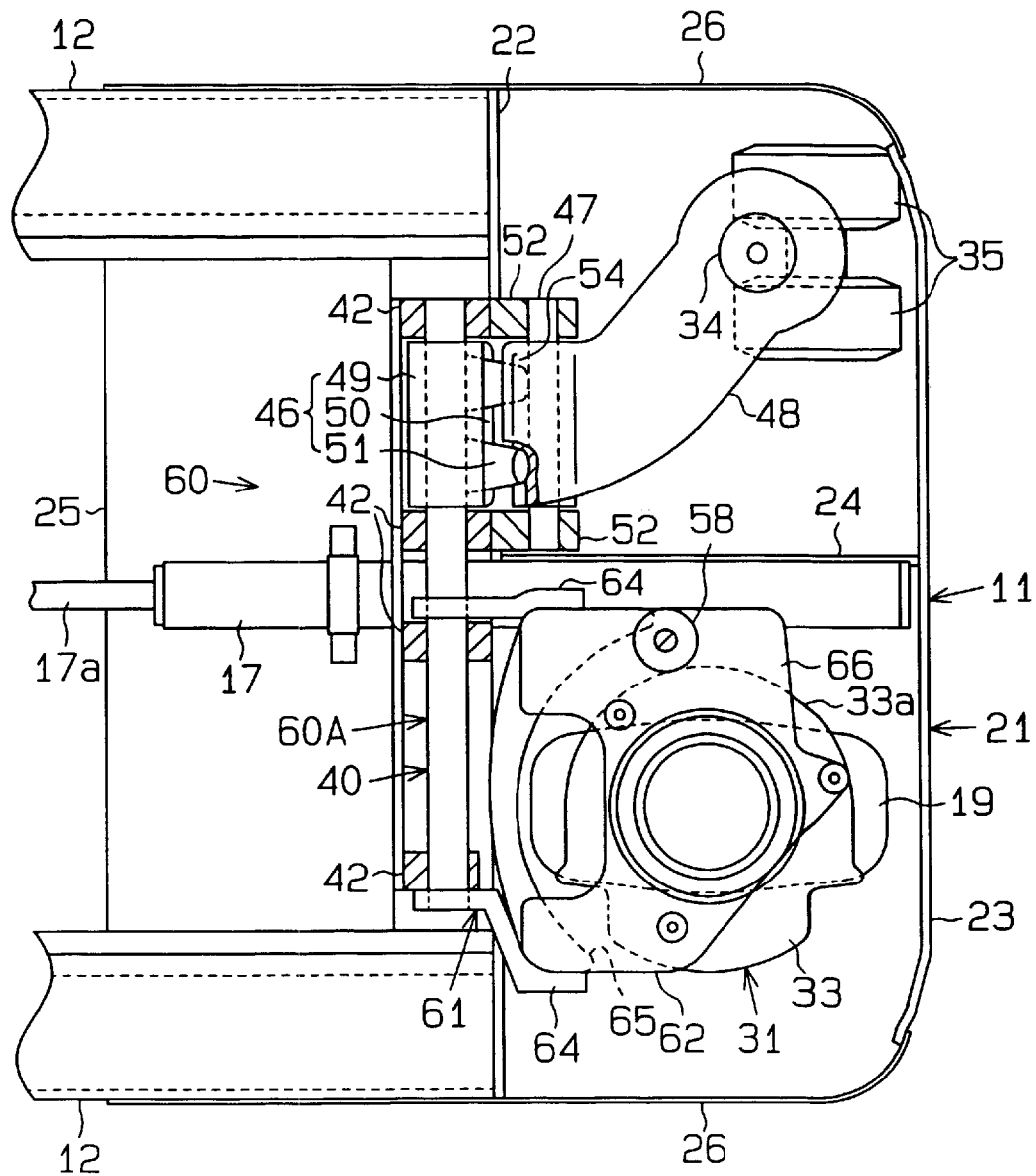
FIG. 8 is a top view, with a part cut away, illustrating the suspension device of FIG. 7.

A suspension device 60 according to a second embodiment of the present invention will now be described with reference to FIGS. 7 and 8. Mainly, the differences from the embodiment of FIGS. 1 to 6 will be discussed below. The embodiment of FIGS. 7 and 8 is different from the embodiment of FIGS. 1 to 6 in that a drive unit support 62 is translated vertically by a parallel linkage 61. Like the embodiment of FIGS. 1 to 6, the suspension device 60 includes an interlock mechanism 60A for interlocking the driving wheel 19 with the caster 35.

As shown in FIGS. 7 and 8, the drive unit support 62 is generally L-shaped as viewed from the side. The drive unit support 62 includes a support base 66 and an arm 65. The support base 66 is substantially horizontal and supports the drive unit 31. The arm 65 is generally perpendicular to the base 66 and extends downward from the front end of the support base 66. The arm 65 is located at the front of the drive unit 31 to support the drive unit 31 from the front.

The parallel linkage 61 includes the drive unit support 62, a pair of upper links 63 and a pair of lower links 64. The upper links 63 are coupled to the sides of the upper portion of the drive unit support 62. The lower links 64 are coupled to the sides of the lower portion of the drive unit support 62.

A bracket 67 is secured to the rear side of the front frame member 22. The proximal ends of the upper links 63 are pivotally coupled to the bracket 67 by a shaft 68. The distal ends of the upper links 63 are pivotally coupled to the sides of the support base 66 by a shaft 69a. The proximal ends of the lower links 64 are integrated with the first rotary shaft 40, which permit the lower links 64 to integrally rotate with the first rotary shaft 40. The distal ends of the lower links 64 are pivotally coupled to the sides of the lower portion of the arm 65 by a shaft 69b.

As shown in FIG. 7, the axes of the shafts 40, 68, 69a, 69b are the vertexes of an imaginary parallelogram. The parallel linkage 61 vertically moves the drive unit support 62 and the drive unit 31 without changing the orientation. The drive unit support 62 moves vertically, and the first rotary shaft 40 and the shaft 68 are fulcrums. That is, the fulcrums of the drive unit support 62 are located in front of the drive unit 31. The axis of the adjuster spring 58 extends vertically, or in the moving direction of the drive unit support 62.

Other than the differences described above, the embodiment of FIGS. 7 and 8 is the same as the embodiment of shown in FIGS. 1 to 6.

In the embodiment of FIGS. 7 and 8, the drive unit 31 is vertically moved by the parallel linkage 61 without changing orientation. Thus, if the forklift 10 is not traveling in a straight line, the driving wheel 19 is not inclined relative to the road surface, which prevents uneven wear of the driving wheel 19.

The drive unit 31 is moved only vertically. Therefore, compared to the embodiment of FIGS. 1 to 6, in which the drive unit 31 is moved about the axis of the first rotary shaft 40, the drive unit 31 occupies less space.

The caster 35 may be moved vertically by a mechanism similar to the parallel linkage 61.

A suspension device 70 according to a third embodiment of the present invention will now be described with reference to FIGS. 9 and 10. Mainly, the differences from the embodiment of FIGS. 1 to 6 will be discussed below. The embodiment of FIGS. 9 and 10 is different from the embodiment of FIGS. 1 to 6 in that an independent suspension device 70, by which the driving wheel 19 and the caster 35 move independently, is used.

Figure 9:
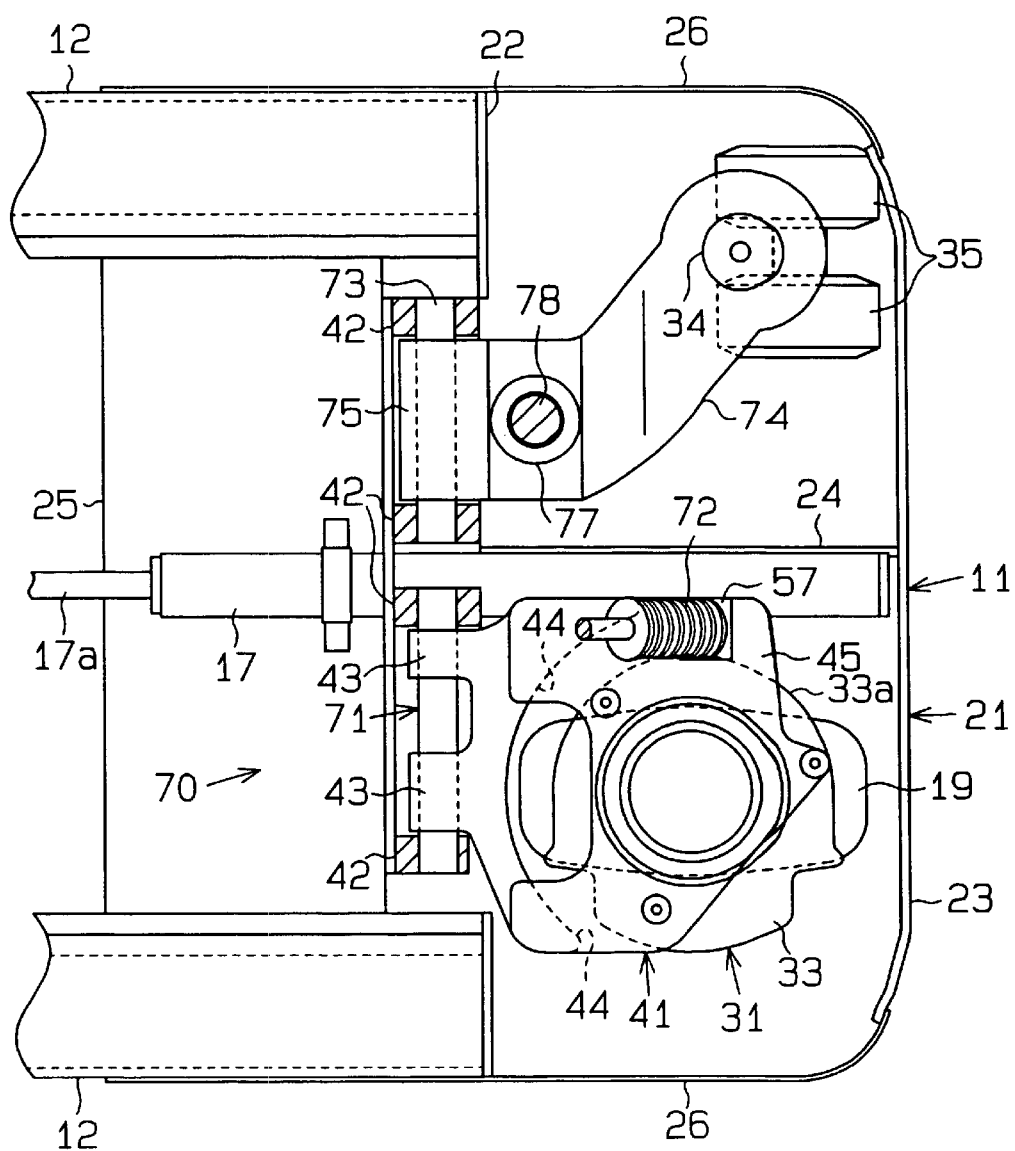
FIG. 9 is a top view, with a part cut away, illustrating a suspension device according to a third embodiment of the present invention.
Figure 10:
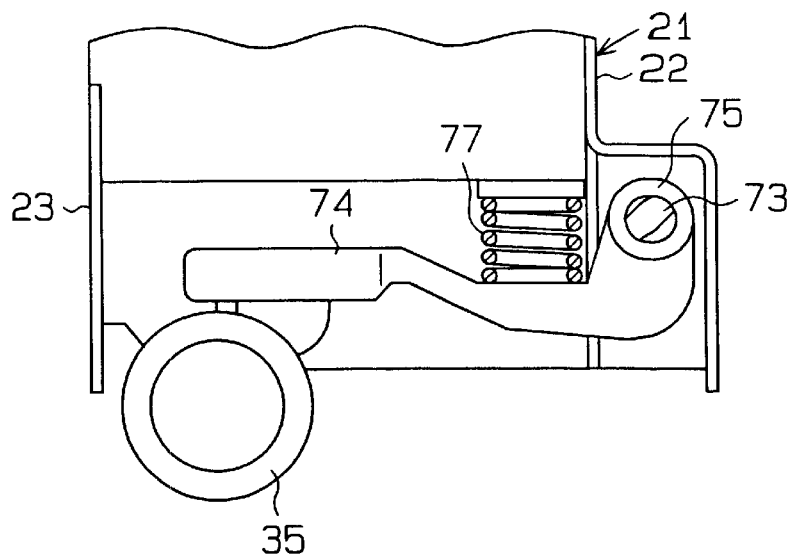
FIG. 10 is a right side view of the suspension device of FIG. 9.

As shown in FIG. 9, the suspension device 70 includes a left rotary shaft 71, which extends in the lateral direction of the body 11, and a drive unit support 41, which is coupled to and rotates integrally with the left rotary shaft 71. The left rotary shaft 71 is located in front of the drive unit 31 and in the left part of the body 11. The left rotary shaft 71 is pivotally supported by the framework 21 through a pair of bearings 42. The drive unit support 41 is the same as that of the embodiment shown in FIGS. 1 to 6 and pivots about the left rotary shaft 71 in a vertical plane about a horizontal axis.

Instead of the adjuster spring 58 in the embodiment of FIGS. 1 to 6, a suspension spring 72 is located between the front frame member 22 and the drive unit support 41. The suspension spring 72 urges the drive unit support 41 downward. The suspension spring 72 permits the driving wheel 19 to move vertically relative to the body 11 in accordance with the load on the driving wheel 19.

The suspension device 70 includes a right rotary shaft 73, which extends in the lateral direction of the body 11, and a caster support 74 coupled to the right rotary shaft 73. The caster support 74 rotates integrally with the right rotary shaft 73. The right rotary shaft 73 is pivotally supported by the framework 21 through a pair of bearings 42. The caster support 74 pivots about the horizontal axis of the right rotary shaft 73, which is a fulcrum, in a vertical plane.

The rotary shafts 71, 73 are located at substantially the same position as the first rotary shaft 40 of the embodiment shown in FIGS. 1 to 6.

As shown in FIGS. 9 and 10, a cylindrical coupler 75 is located at the proximal end of the caster support 74. The cylindrical coupler 75 is mated with the right rotary shaft 73 by splines. The caster support 74 extends rearward and to the right from the coupler 75. A caster spring 77 is located between the upper surface of the proximal portion of the caster support 74 and the bottom plate 13a of the cab 13. The caster spring 77 urges the caster support 74 downward. The caster spring 77 permits the caster 35 to move vertically relative to the body 11 in accordance with the load on the caster 35.

The center of gravity of the forklift 10 is moved forward and rearward according to the weight of a load on the lift mechanism 16, the position of the lift mechanism 16 and the height of the fork of the lift mechanism 16. The suspension device 70 is designed such that the load on the driving wheel 19 is always greater than the load on the caster 35 regardless of the location of the center of gravity of the forklift 10, which prevents the driving wheel 19 from skidding. As the center of gravity is moved rearward, the difference between the load on the driving wheel 19 and the load on the caster 35 is increased. However, the body 11 is always maintained level.

The load on the driving wheel 19 is mainly determined by the distance between the left rotary shaft 71 and the driving wheel 19, the distance between the left rotary shaft 71 and the suspension spring 72 and the force and the spring constant of the suspension spring 72. The load on the caster 35 is mainly determined by the distance between the right rotary shaft 73 and the caster 35, the distance between the right rotary shaft 73 and the caster spring 77 and the force and the spring constant of the caster spring 77.

Other than the differences described above, the embodiment of FIGS. 9 and 10 is the same as the embodiment shown in FIGS. 1 to 6.

In the embodiment of FIGS. 9 and 10, which has the independent suspension device 70, the driving wheel 19 is moved independently from the caster 35. Shocks applied to the driving wheel 19 from the road surface are absorbed by the suspension spring 72 and do not influence the caster 35. Shocks applied to the caster 35 from the road surface are absorbed by the caster spring 77 and do not influence the driving wheel 19. Therefore, when the forklift 10 moves on a road having small bumps and dips, the driving wheel 19 and the caster 35 do not loose contact with the road surface. Also, vibration transmitted to the body 11 is reduced.

A suspension device 80 according to a fourth embodiment of the present invention will now be described with reference to FIGS. 11 and 12. Like the embodiment of FIGS. 9 and 10, the suspension device 80 is an independent suspension. However, the embodiment of FIGS. 11 and 12 is different from the embodiment of FIGS. 9 and 10 in that the drive unit support 82 is moved vertically.

Figure 11:
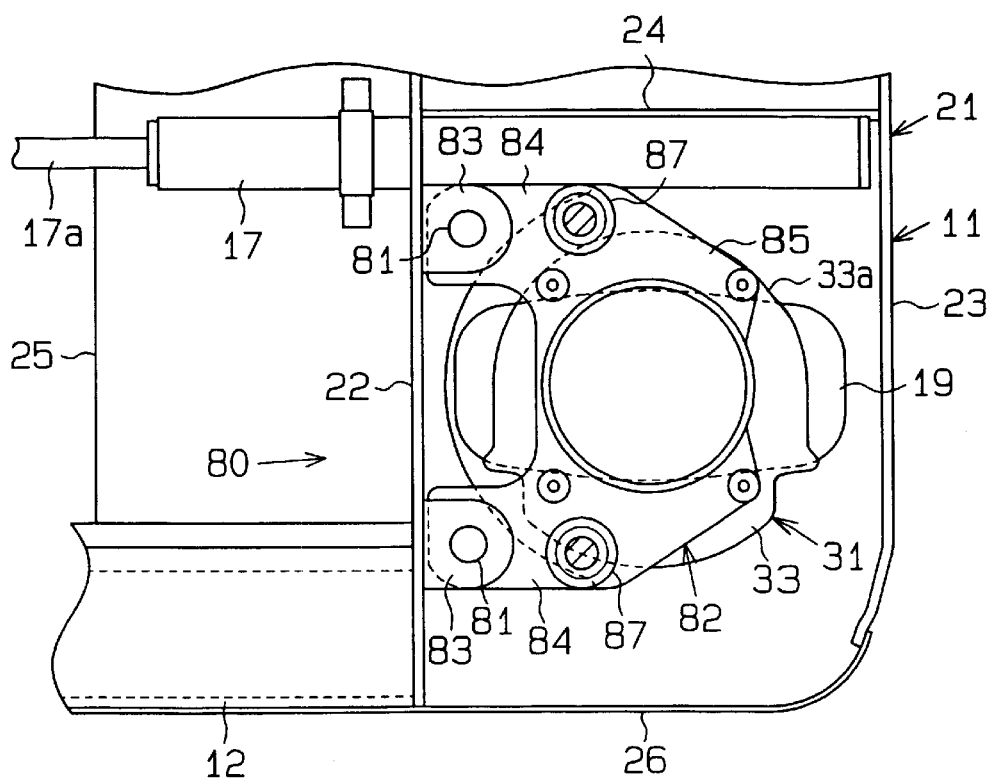
FIG. 11 is a top view, with a part cut away, illustrating a suspension device according to a fourth embodiment of the present invention.
Figure 12:
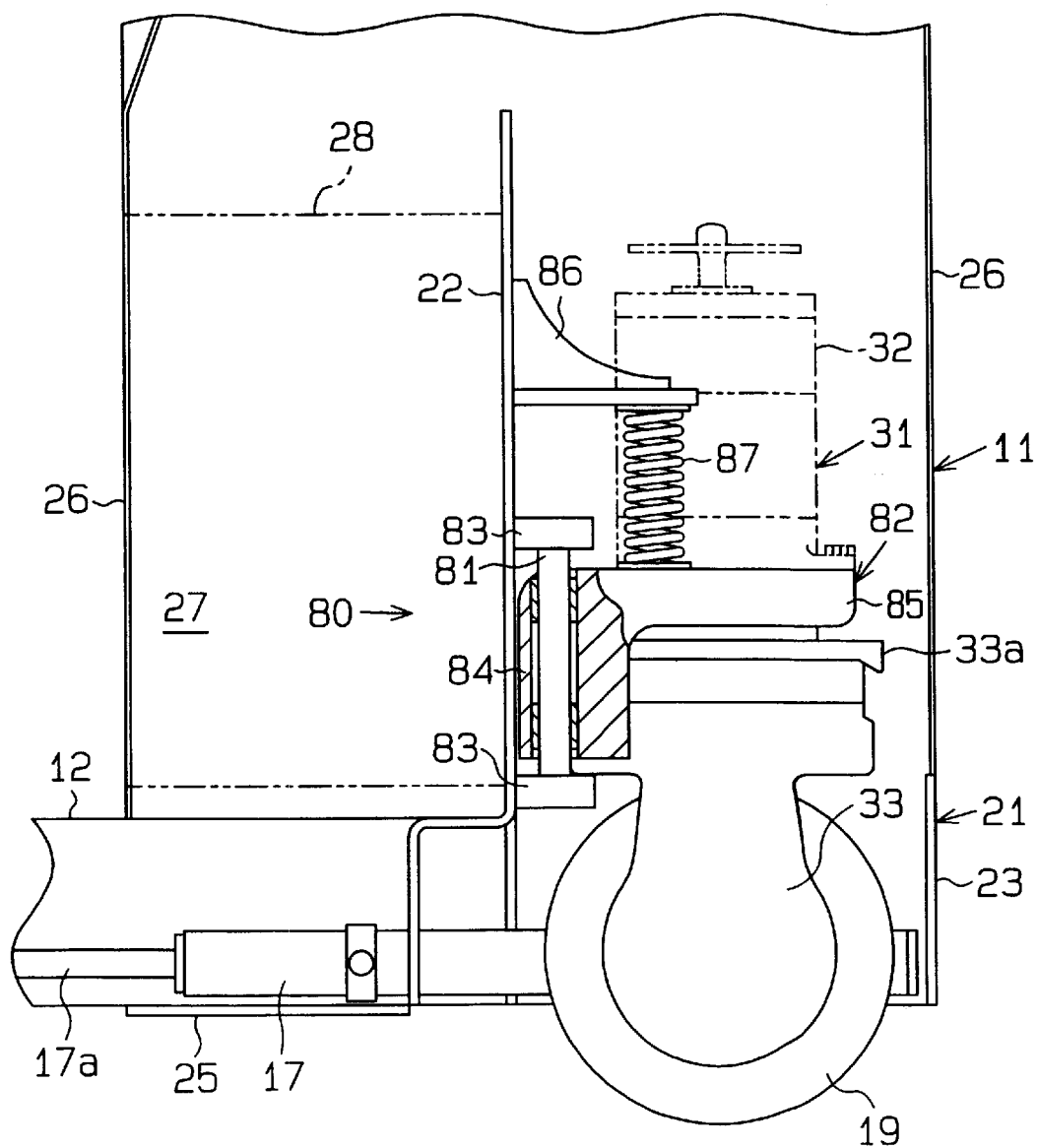
FIG. 12 is a left side view of the suspension device of FIG. 11.

As shown in FIGS. 11 and 12, the suspension device 80 includes a pair of vertical support shafts 81. The support shafts 81 are located in front of the drive unit 31. Each support shaft 81 is fixed to the front frame member 22 by a pair of brackets 83. The drive unit support 82 is supported by the support shafts 81 to move vertically.

The drive unit support 82 includes a pair of guide cylinders 84 and a pair of horizontal bases 85. Each guide cylinder 84 is fitted to one of the support shaft 81 to move axially. Each base 85 extends from one of the guide cylinders 84. A drive unit 31, which is the same as that of the embodiment of FIGS. 1 to 6, is supported by the bases 85. The drive unit 31, together with the drive unit support 82, is moved vertically along the support shafts 81.

The support shafts 81, which permit the drive unit support 82 to move vertically, are located in front of the drive unit 31. In other words, the structure that vertically guides the support 82 relative to the body 11 is located in front of the drive unit 31.

A bracket 86 is fixed to the rear side of the front frame member 22. A pair of suspension springs 87 are located between the bracket 86 and the base 85. The suspension springs 87 urge the drive unit support 82 downward. The suspension springs 87 permit the driving wheel 19 to move vertically relative to the body 11 in accordance with the load on the driving wheel 19.

The structure for supporting the caster 35 is illustrated in FIG. 10. Other than the differences described above, the embodiment of FIGS. 11 and 12 is the same as the embodiment shown in FIGS. 9 to 10.

Like the embodiment of FIGS. 7 and 8, in which a parallel linkage is used, the drive unit 31 is moved vertically without changing its orientation in the embodiment of FIGS. 11 and 12. Thus, if the forklift 10 is not running in a straight line, the driving wheel 19 is not inclined relative to the road surface, which prevents uneven wear of the driving wheel 19.

The structure of the embodiment of FIGS. 11 and 12 may be applied to the supporting structure of the caster 35 so that the caster 35 is moved vertically.

A suspension device 90 according to a fifth embodiment will now be described with reference to FIG. 13. Mainly, the differences from the embodiment of FIGS. 1 to 6 will be discussed below.

The suspension device 90 includes a pivot frame 92. The pivot frame 92 pivots about a pivot axis that extends horizontally in the longitudinal direction of the body 11. The pivot axis is located at the lateral center of the body 11. A pair of brackets 91 are fixed to the framework 21 and are located on the pivot axis. The pivot frame 92 is supported by the brackets 91.

Each bracket 91 has a hole 93, which extends along the pivot axis. The pivot frame 92 has a pair of pivot shafts 97 (only one is shown in FIG. 13), each of which is engaged with the hole 93 of one of the brackets 91.

The pivot frame 92 includes a base 94, a drive unit support 95 and a caster support 96. The base 94 extends in the lateral direction of the body 11. The drive unit support 95 extends rearward from the left end of the base 94. The caster support 96 extends rearward from the right end of the base 94. The drive unit support 95 is substantially L-shaped and has a horizontal base 98 for supporting the drive unit 31. The drive unit 31 is the same as that of the embodiment of FIGS. 1 to 6. The caster 35 is supported by the distal end of the caster support 96. The brackets 91, which support the support frame 92, are located in front of the drive unit 31. In other words, the pivot fulcrum of the pivot frame 92 is located in front of the drive unit 31. The pivot frame 92 crosses the reach cylinder 17 at a location in front of the cab 13.

The pivot frame 92 functions as an interlock mechanism for coupling the driving wheel 19 with the caster 35. The interlock mechanism, which is the pivot frame 92, moves the driving wheel 19 and the caster 35 in opposite directions.

A bracket 99 is fixed to the framework 21. An adjuster spring 100 is located between the bracket 99 and the support base 98. The adjuster spring 100 urges the drive unit support 95 downward.

The distance between the pivot axis of the pivot frame 92 and the driving wheel 19 is substantially equal to the distance between the pivot axis of the pivot frame 92 and the caster 35. Thus, if the force of the adjuster spring 100 is not taken into account, the load acting on the driving wheel 19 is substantially equal to the load acting on the caster 35. However, since the force of the adjuster spring 100 acts on the driving wheel 19, the load acting on the driving wheel 19 is greater than the load acting on the caster 35.

Figure 13:
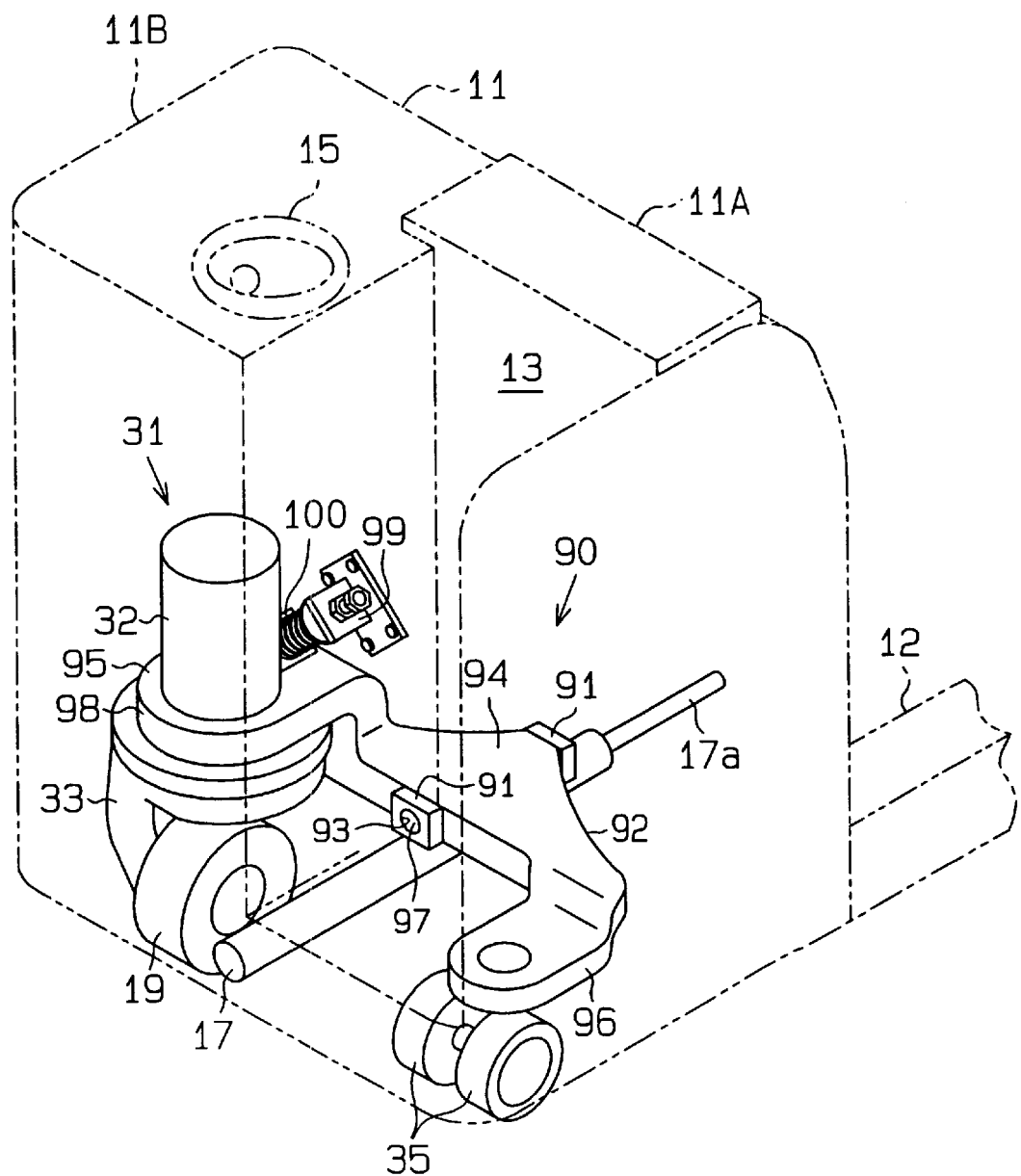
FIG. 13 is a perspective view illustrating a suspension device according to a fifth embodiment of the present invention.

In the embodiment of FIG. 13, the pivot frame 92, which is an integral part, supports the driving wheel 19 and the caster 35. Therefore, the structure of the suspension device 90 is simple, which reduces the number of parts and simplifies the assembly of the device 90.

It should be apparent to those skilled in the art that the present invention may be embodied in many other specific forms without departing from the spirit or scope of the invention. Particularly, it should be understood that the invention may be embodied in the following forms.

Figure 14:
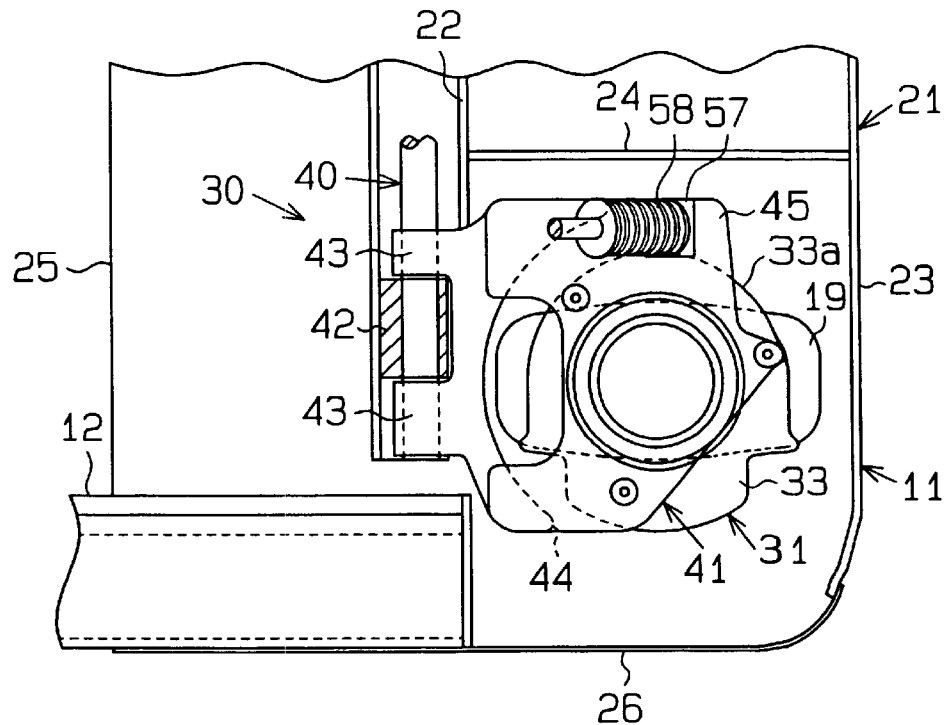
FIG. 14 is a top view, with a part cut away, illustrating a suspension device according to another embodiment of the present invention.

In FIG. 1, the couplers 43 of the drive unit support 41 are coupled to the first rotary shaft 40 between the bearings 42. However, as shown in FIG. 14, the couplers 43 of the drive unit support 41 may be coupled to the first rotary shaft 40 at the sides of a single bearing 42. The structure of FIG. 14 may be applied to the embodiment of FIGS. 9 and 10.

Figure 15:
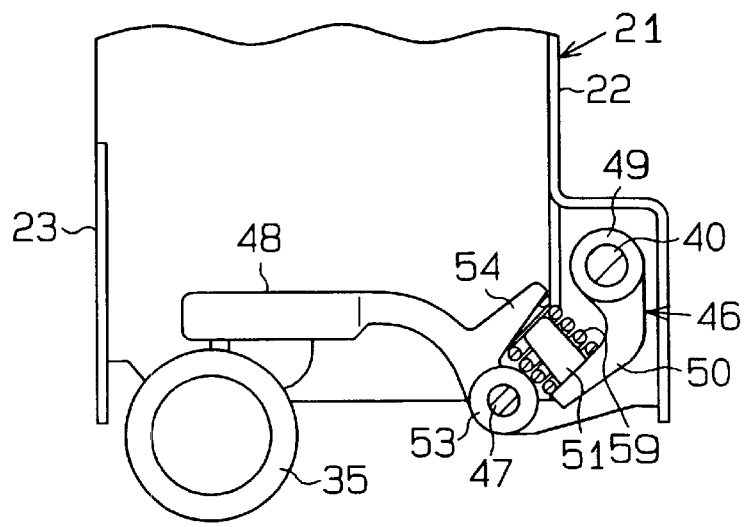
FIG. 15 is a right side view illustrating a suspension device according to another embodiment of the present invention.

The embodiment shown in FIG. 15 is a modification of the embodiment of FIG. 6. Unlike the embodiment of FIG. 6, a spring 59 is located between the arm plate 50 and the contact plate 54 in FIG. 15. When the driving wheel 19 and the caster 35 contact the road surface, the spring 59 separates the contact plate 54 from the projections 51 on the arm plate 50. Therefore, when the forklift 10 travels on relatively small bumps and dips, small vibrations of the driving wheel 19 and the caster 35 are absorbed by the spring 59. The small vibrations are not transmitted from the driving wheel 19 to the caster 35 or from the caster 35 to the driving wheel 19, which reduces vibrations transmitted to the body 11.

Figure 16:
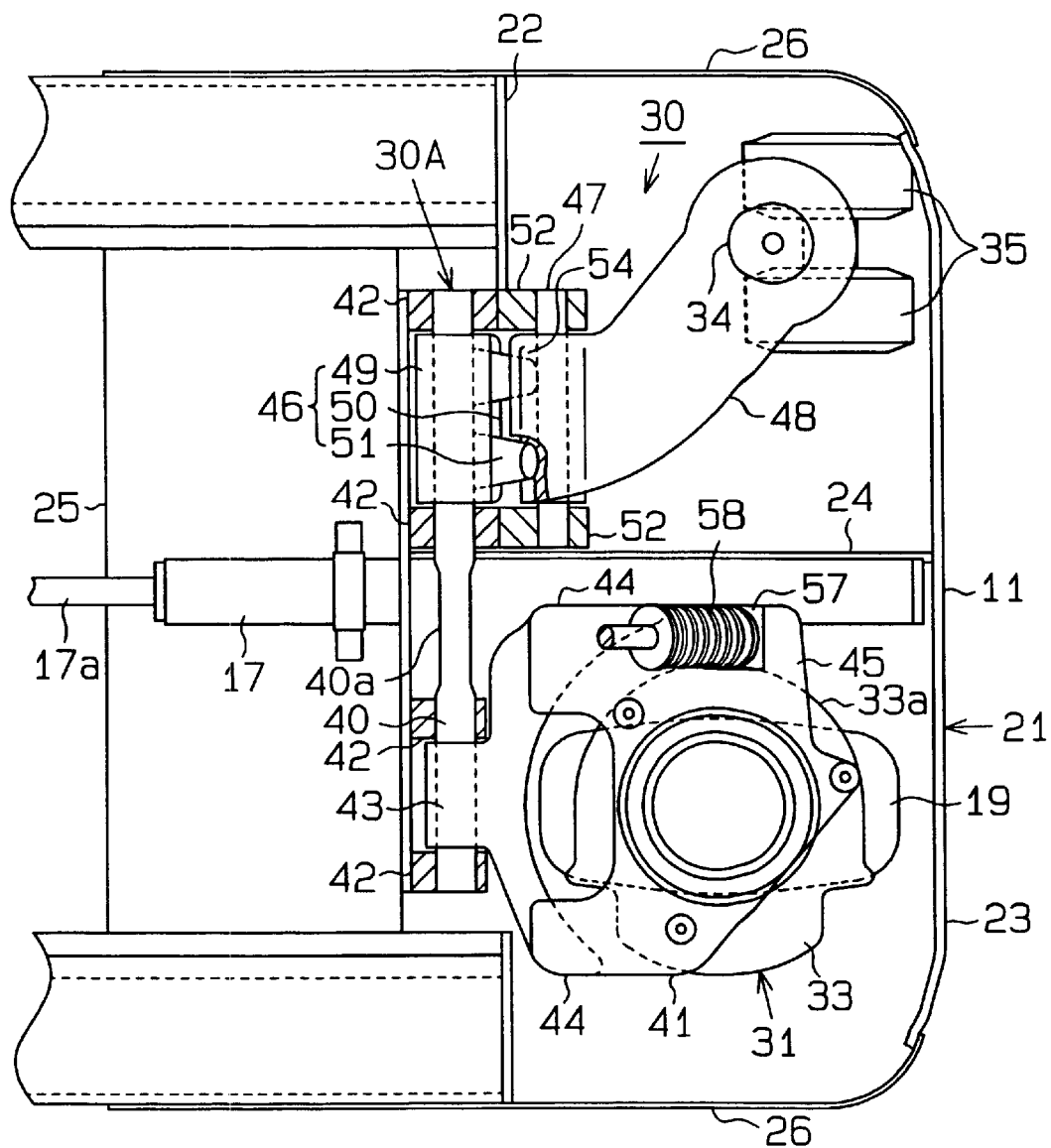
FIG. 16 is a top view, with a part cut away, illustrating a suspension device according to another embodiment of the present invention.

An embodiment of FIG. 16 is a modification of the embodiment of FIG. 1. Unlike the embodiment of FIG. 1, a small diameter portion 40a is formed in the axial center of the first rotary shaft 40 in FIG. 16. The small diameter portion 40a reduces the spring constant of the first rotary shaft 40, which permits the first rotary shaft 40 to be more easily twisted. That is, the first rotary shaft 40 of FIG. 16 is not as stiff as that of FIG. 1. The structure of FIG. 16 may be applied to the embodiment of FIGS. 7 and 8.

The caster 35 may be supported by a caster support with an elastic body such as a spring located between the caster 35 and the caster support. In this case, the elastic body absorbs vibrations transmitted from the road surface to the caster 35.

The interlock mechanism 30A may have a structure other than that shown in FIG. 1. For example, unlike the structure of FIG. 1, the caster support 48 may be rotatably supported by the first rotary shaft 40 and the drive unit support 41 may be coupled to the first rotary shaft 40 through the second rotary shaft 47 and the transmission arm 46.

In the embodiment of FIG. 1, the transmission arm 46 and the contact plate 54 reverse the direction of transmitted force. However, the direction of force may be reversed by a gear mechanism.

The part for pivotally coupling the drive unit support to the body 11 need not be located in front of the drive unit 31. The part may be located behind the drive unit 31. That is, the part may be located anywhere in the body 11 as long as it is not at a side of the drive unit 31 in the lateral direction.

The driving wheel 19 need not be steered.

The adjuster spring 58 in FIGS. 4 and 7 may be replaced by a fluid pressure cylinder such as an oil pressure cylinder or an air pressure cylinder. The adjuster spring 100 in FIG. 13 may also be replaced by a fluid pressure cylinder.

The reach cylinder 17 may be replaced by an actuator that is driven by a motor.

The present invention may be applied to industrial vehicles other than the reach type forklift 10. The present invention may be applied to a suspension device for suspending front wheels of a vehicle.

The present examples and embodiments are to be considered as illustrative and not restrictive and the invention is not to be limited to the details given herein, but may be modified within the scope and equivalence of the appended claims.

What is claimed is:

1. A suspension device for an industrial vehicle, wherein the vehicle has a driving wheel and a coasting wheel, the driving wheel and the coasting wheel being laterally spaced apart, wherein the suspension device suspends the driving wheel and the coasting wheel relative to a vehicle body, and wherein a cab is located at a side of the vehicle body and above the coasting wheel, the suspension device comprising:

a coasting wheel support, wherein the coasting wheel support supports the coasting wheel such that the coasting wheel moves upward and downward relative to the vehicle body;

a drive unit to which the driving wheel is attached;

a drive unit support, wherein the drive unit support supports the drive unit such that the drive unit moves upward and downward relative to the vehicle body; and a coupler located in the vehicle body, wherein the drive unit support is coupled to the coupler such that the drive unit support moves relative to the vehicle body, wherein the coupler is located at a position other than a position that is lateral of the drive unit.

2. The suspension device according to claim 1, wherein the drive unit support pivots about the coupler about a lateral axis.

3. The suspension device according to claim 2, wherein the coupler is a shaft that extends in the lateral direction of the vehicle body, and wherein the shaft is located in front of the drive unit.

4. The suspension device according to claim 3, wherein the drive unit support includes:

an arm extending upward from the shaft, wherein the arm is located in front of the drive unit; and a support base that extends generally horizontally rearward from an upper end of the arm, wherein the drive unit is attached to the support base.

5. The suspension device according to claim 1, wherein the coupler supports the drive unit support such that the drive unit support can translate vertically.

6. The suspension device according to claim 5, further comprising a parallel linkage located between the coupler and the drive unit support.

7. The suspension device according to claim 5, wherein the coupler is a shaft that extends vertically, and wherein the drive unit support is coupled to the shaft such that the drive unit support can translate along the shaft.

8. The suspension device according to claim 1, wherein the suspension device permits the drive unit support and the coasting wheel support to move independently.

9. The suspension device according to claim 1, further comprising an interlock mechanism, wherein the interlock mechanism interlocks the drive unit support with the coasting wheel support such that the driving wheel and the coasting wheel move in opposite directions.

10. The suspension device according to claim 9, wherein the interlock mechanism includes the coupler, and the coupler is a rotatable shaft that extends in the lateral direction of the vehicle body, and wherein load acting on the driving wheel and load acting on the coasting wheel are applied to the shaft as opposing torsional forces.

11. The suspension device according to claim 10, wherein the shaft rotates such that the torsion applied to the shaft by the driving wheel and the torsion applied to the shaft by the coasting wheel are balanced, and the driving wheel and the coasting wheel move in opposite directions.

12. The suspension device according to claim 10, wherein the drive unit support is fixed to the shaft such that the drive unit support pivots about the axis of the shaft, wherein the interlock mechanism includes a power transmission mechanism that is located between the shaft and the coasting wheel support, and wherein the power transmission mechanism connects the coasting wheel support with the shaft such that the direction of a force applied to the shaft from the coasting wheel support is opposite to that of a force applied to the shaft from the drive unit support.

13. The suspension device according to claim 12, wherein the shaft is a first shaft, the power transmission mechanism comprising:

a second shaft extending in the lateral direction of the vehicle body, wherein the coasting wheel support is supported on the second shaft such that the coasting wheel support pivots about the axis of the second shaft;

a transmission arm fixed to the first shaft; and a contact member located on the coasting wheel support, wherein the contact member contacts the transmission arm.

14. The suspension device according to claim 9, wherein the industrial vehicle includes a carrier for carrying a load and an actuator for moving the carrier forward and rearward, and wherein the interlock mechanism crosses the actuator at a location that is forward or rearward of the cab.

15. The suspension device according to claim 14, wherein the interlock mechanism includes the coupler and the coupler is a rotatable shaft that extends in the lateral direction of the vehicle body, and wherein the shaft crosses the actuator at a location that is forward or rearward of the cab.

16. A suspension device for an industrial vehicle, wherein the vehicle has a driving wheel and a coasting wheel, the driving wheel and the coasting wheel being laterally spaced apart, wherein the suspension device suspends the driving wheel and the coasting wheel relative to a vehicle body, the suspension device comprising:

a coasting wheel support, wherein the coasting wheel support supports the coasting wheel such that the coasting wheel moves upward and downward relative to the vehicle body;

a drive unit to which the driving wheel is attached;

a drive unit support, wherein the drive unit support supports the drive unit such that the drive unit moves upward and downward relative to the vehicle body; and an interlock mechanism, wherein the interlock mechanism interlocks the drive unit support with the coasting wheel support such that the driving wheel and the coasting wheel move in opposite directions, wherein the interlock mechanism includes a rotatable shaft that extends in the lateral direction of the vehicle body, and wherein load acting on the driving wheel and load acting on the coasting wheel are applied to the shaft as opposing torsional forces, and wherein the shaft rotates such that the torsion applied to the shaft by the driving wheel and the torsion applied to the shaft by the coasting wheel are balanced, and the driving wheel and the coasting wheel move in opposite directions.

17. The suspension device according to claim 16, wherein the drive unit support is fixed to the shaft such that the drive unit support pivots about the axis of the shaft, wherein the interlock mechanism includes a power-transmission mechanism that is located between the shaft and the coasting wheel support, and wherein the power transmission mechanism connects the coasting wheel support with the shaft such that the direction of a force applied to the shaft from the coasting wheel support is opposite to that of a force applied to the shaft from the drive unit support.

18. The suspension device according to claim 17, wherein the shaft is a first shaft, the power transmission mechanism comprising:
 a second shaft extending in the lateral direction of the vehicle body, wherein the coasting wheel support is supported on the second shaft such that the coasting wheel support pivots about the axis of the second shaft;
 a transmission arm fixed to the first shaft; and
 a contact member located on the coasting wheel support, wherein the contact member contacts the transmission arm.

19. The suspension device according to claim 18, wherein an elastic body is located between the transmission arm and the contact member.

20. The suspension device according to claim 16, wherein the vehicle includes a cab located at a side of the vehicle body and above the coasting wheel, a carrier for carrying a load and an actuator for moving the carrier forward and rearward, and wherein the shaft crosses the actuator at a location that is forward or rearward of the cab.

21. A suspension device for an industrial vehicle, wherein the vehicle has a driving wheel and a coasting wheel, the driving wheel and the coasting wheel being laterally spaced apart, wherein the suspension device suspends the driving wheel and the coasting wheel relative to a vehicle body, wherein the vehicle includes a cab located at a side of the vehicle body and above the coasting wheel, a carrier for carrying a load and an actuator for moving the carrier forward and rearward, the suspension device comprising:
 a coasting wheel support, wherein the coasting wheel support supports the coasting wheel such that the coasting wheel moves upward and downward relative to the vehicle body;
 a drive unit to which the driving wheel is attached;
 a drive unit support, wherein the drive unit support supports the drive unit such that the drive unit moves upward and downward relative to the vehicle body; and
 an interlock mechanism, wherein the interlock mechanism interlocks the drive unit support with the coasting wheel support such that the driving wheel and the coasting wheel move in opposite directions, and wherein the interlock mechanism crosses the actuator at a location that is forward or rearward of the cab.

22. The suspension device according to claim 21, wherein the interlock mechanism includes a rotatable shaft that extends in the lateral direction of the vehicle body, and wherein the shaft intersects the actuator at a position that is in front of the cab.

* * * * *

UNITED STATES PATENT AND TRADEMARK OFFICE
CERTIFICATE OF CORRECTION

PATENT NO. : 6,488,297 B2
DATED : December 3, 2002
INVENTOR(S) : Mikio Murase

It is certified that error appears in the above-identified patent and that said Letters Patent is hereby corrected as shown below:

<u>Title page,</u>
Item [*] Notice, delete the phrase "by 70 days" and insert -- by 47 days --

<u>Column 6,</u>
Line 40, please delete "H4" and insert -- H1 --

Signed and Sealed this

Twentieth Day of April, 2004

JON W. DUDAS
*Acting Director of the United States Patent and Trademark Office*